US009676285B2

(12) United States Patent
Niederhauser et al.

(10) Patent No.: US 9,676,285 B2
(45) Date of Patent: Jun. 13, 2017

(54) VEHICLE CHARGING PAD HAVING REDUCED THICKNESS

(71) Applicant: QUALCOMM Incorporated, San Diego, CA (US)

(72) Inventors: Steven Daniel Niederhauser, Munich (DE); Nicholas Athol Keeling, Auckland (NZ); Hanspeter Widmer, Wohlenschwil (CH); Markus Bittner, Sarmenstorf (CH)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 14/155,638

(22) Filed: Jan. 15, 2014

(65) Prior Publication Data

US 2014/0327391 A1 Nov. 6, 2014

Related U.S. Application Data

(60) Provisional application No. 61/818,387, filed on May 1, 2013.

(51) Int. Cl.
| | |
|---|---|
| *H01F 3/08* | (2006.01) |
| *B60L 11/18* | (2006.01) |
| *H01F 38/14* | (2006.01) |
| *H01F 27/36* | (2006.01) |
| *B60L 3/00* | (2006.01) |
| *B60L 3/04* | (2006.01) |
| *H01F 27/30* | (2006.01) |

(52) U.S. Cl.
CPC .............. *B60L 11/182* (2013.01); *B60L 3/003* (2013.01); *B60L 3/04* (2013.01); *B60L 11/1824* (2013.01); *B60L 11/1833* (2013.01); *B60L 11/1846* (2013.01); *B60L 11/1861* (2013.01); *B60L 11/1879* (2013.01); *H01F 3/08* (2013.01); *H01F 27/365* (2013.01); *H01F 38/14* (2013.01); *B60L 2210/10* (2013.01); *B60L 2210/30* (2013.01); *B60L 2210/40* (2013.01); *B60L 2240/36* (2013.01); *B60L 2240/70* (2013.01);
(Continued)

(58) Field of Classification Search
CPC ........................................................ H01F 3/08
USPC ........................................................ 320/108
See application file for complete search history.

(56) References Cited

U.S. PATENT DOCUMENTS

| | | |
|---|---|---|
| 8,294,324 B2 | 10/2012 | Ishigami et al. |
| 8,461,719 B2 | 6/2013 | Kesler et al. |

(Continued)

FOREIGN PATENT DOCUMENTS

| | | |
|---|---|---|
| WO | WO-2010080739 A2 | 7/2010 |
| WO | WO-2012018268 A1 | 2/2012 |

(Continued)

OTHER PUBLICATIONS

International Search Report and Written Opinion—PCT/US2014/035884—ISA/EPO—Sep. 12, 2014.

*Primary Examiner* — Thuan Do
(74) *Attorney, Agent, or Firm* — Knobbe, Marten, Olson & Bear, LLP

(57) ABSTRACT

This disclosure provides systems, methods and apparatus for charging pads for use with wireless power systems. In one aspect a vehicle charging pad having a reduced thickness is provided. A charging pad may include multiple wire coils and a ferrite block backing. By forming a longitudinally extending slot in the ferrite block, a portion of the wires extending from the coils can be routed through the slot in the ferrite block to decrease the overall thickness of the charging pad.

29 Claims, 17 Drawing Sheets

(52) U.S. Cl.
CPC ......... *H01F 27/306* (2013.01); *Y02T 10/7005* (2013.01); *Y02T 10/705* (2013.01); *Y02T 10/7044* (2013.01); *Y02T 10/7072* (2013.01); *Y02T 10/7216* (2013.01); *Y02T 10/7241* (2013.01); *Y02T 10/7291* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2009/0230777 A1 | 9/2009 | Baarman et al. |
| 2011/0057629 A1* | 3/2011 | Lin .................. H02K 3/26 322/3 |
| 2011/0210617 A1 | 9/2011 | Randall |
| 2012/0025602 A1 | 2/2012 | Boys et al. |
| 2012/0025603 A1 | 2/2012 | Boys et al. |
| 2012/0049991 A1 | 3/2012 | Baarman et al. |
| 2012/0248892 A1 | 10/2012 | Covic et al. |
| 2012/0313742 A1* | 12/2012 | Kurs et al. .................... 336/180 |
| 2014/0125140 A1* | 5/2014 | Widmer .................. H02J 7/025 307/104 |
| 2014/0239729 A1* | 8/2014 | Covic .................... H02J 17/00 307/104 |

FOREIGN PATENT DOCUMENTS

| | | |
|---|---|---|
| WO | WO-2012073427 A1 | 6/2012 |
| WO | WO-2012120896 A1 | 9/2012 |
| WO | WO-2012172813 A1 | 12/2012 |
| WO | WO-2013019122 A1 | 2/2013 |
| WO | WO-2013036146 A1 | 3/2013 |

* cited by examiner

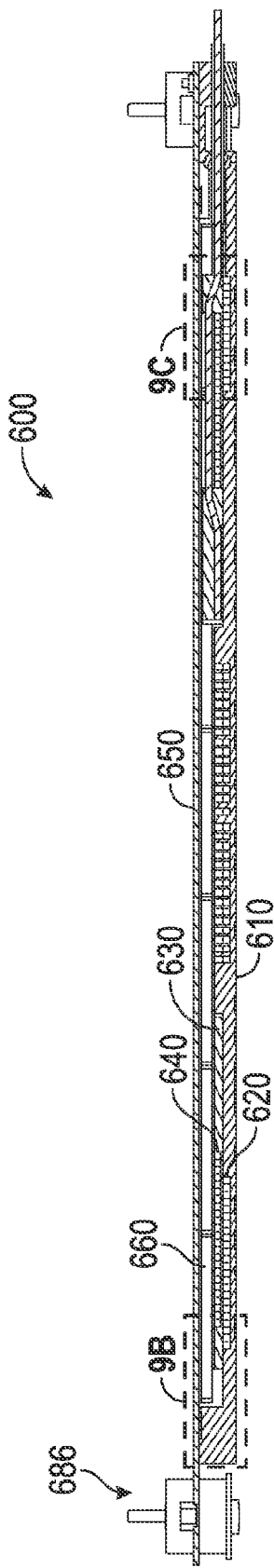
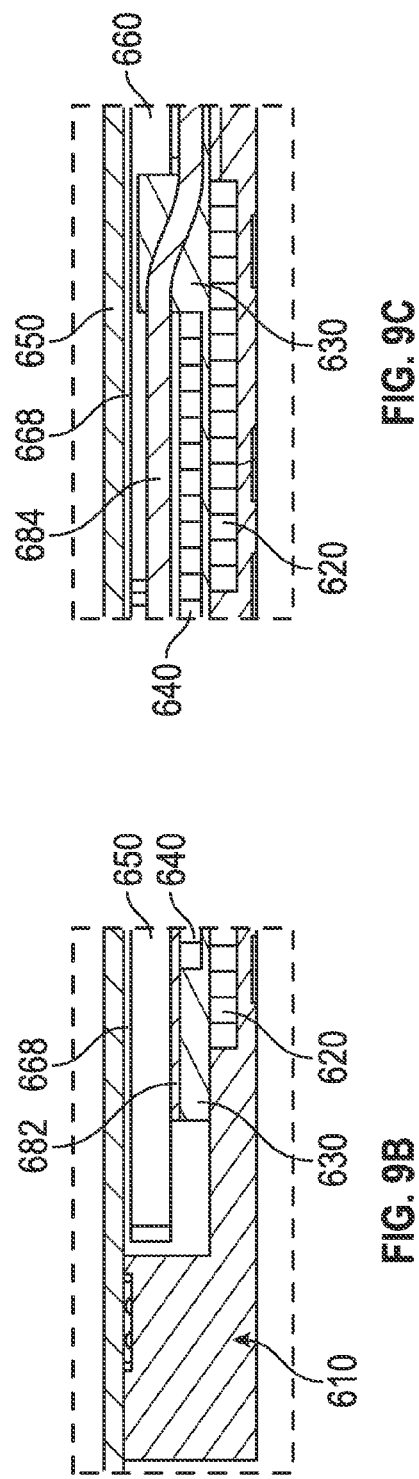
FIG. 9A
FIG. 9B
FIG. 9C

VEHICLE CHARGING PAD HAVING REDUCED THICKNESS

CROSS-REFERENCE TO RELATED APPLICATIONS

This application claims the benefit of U.S. Provisional Patent Application No. 61/818,387 filed on May 1, 2013, which is hereby incorporated by reference in its entirety.

FIELD

The present disclosure relates generally to wireless power transfer, and more specifically to devices, systems, and methods related to wireless power transfer to remote systems such as vehicles including batteries, and in particular to charging pads, such as vehicle charging pads, having a reduced thickness

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a charging pad, including a first coil structure, the first coil structure including a first coil section wound in a first direction, and a second coil section coplanar with the first coil section and wound in a second direction opposite the first direction, a second coil structure, and a ferrite block structure, the ferrite block structure including two ferrite block sections separated by a longitudinally extending slot, and at least one wire extending from the first coil structure and at least one wire extending from the second coil structure extending through a portion of the longitudinally extending slot in the ferrite block structure.

The first coil section can be wound about a first pole and the second coil section can be wound around about a second pole, and the longitudinally extending slot can be substantially parallel to a geometric line extending between the first and second poles. The flux from the first and second poles can be in opposite directions.

The second coil structure can be wound about a first pole, and the longitudinally extending slot can substantially intersect the first pole. The second coil structure can interact with a vertical magnetic flux.

The longitudinally extending slot in the ferrite block structure can pass over the centers of the first and second coil sections of the first coil structure, and can pass over the center of the second coil structure.

The ferrite block structure can be located on the opposite side of the second coil structure from the first coil structure. The ferrite block structure can be a modular ferrite block assembly including a plurality of ferrite tiles. Each of the corners of the ferrite tiles can include at least a slight chamfer. The ferrite tiles can include a plurality of substantially rectangular ferrite tiles, and plurality of ferrite tiles having at least one chamfered corner, where four of the plurality of ferrite tiles are positioned such that the chamfered corners are located adjacent one another to form an aperture extending through the ferrite block assembly.

The pad can also include a base plate supporting the ferrite block structure, and a pad cover supporting the first coil structure, where the base plate is secured to the pad cover with the first coil structure, the second coil structure, and the ferrite block structure disposed therebetween.

The first coil structure can include a first wire extending from the first coil section and a second wire extending from the second coil section, and the second coil structure can include a third wire extending from an interior of the second coil structure and a fourth wire extending from an exterior of the second coil structure, where at least the first, second and third wires extend through a portion of the longitudinally extending slot in the ferrite block structure. The first and second wires can pass through the center of the second coil structure and pass over the second coil structure on the opposite side of the second coil structure from the first and second coil portions of the first coil structure.

The pad can additionally include a support plate supporting the second coil structure. The support plate can additionally include a first plurality of groove segments located on the interior of the second coil structure, and a second plurality of groove segments located on the exterior of the second coil structure and cooperating with the first plurality of groove segments to define at least three wire paths extending over the second coil structure, where the first, second and third wires are retained within the at least three wire paths.

One aspect of the disclosure provides a ferrite block structure for use in a charging pad, the structure including a base plate a first ferrite block section supported by the base plate, and a second ferrite block section supported by the base plate and separated from the first ferrite block section by a longitudinally extending slot.

The dimensions of first ferrite block section can be equal to the dimensions of the second ferrite block section. The structure of claim 18, where the longitudinally extending slot can be aligned with a longitudinally extending centerline of the base plate. The structure of claim 18, where the first and second ferrite block sections can be secured to the base plate by an adhesive.

The ferrite block structure can be a modular ferrite block assembly including a plurality of ferrite tiles. Each of the corners of the ferrite tiles can include at least a slight chamfer. The ferrite tiles can include a plurality of substantially rectangular ferrite tiles, and a plurality of ferrite tiles having at least one chamfered corner, where four of the plurality of ferrite tiles are positioned such that the chamfered corners are located adjacent one another to form an aperture extending through the ferrite block assembly.

One aspect of the disclosure provides a charging pad, including first means for extracting power from a horizontal component of a magnetic field intercepted by the charging pad, second means for extracting power from a vertical component of the magnetic field intercepted by the charging pad, means for enhancing coupling between the first and second power extracting means and a wireless charging system, and means for permitting passage between sections of the coupling enhancing means of at least one wire extending from the first power extracting means and at least one wire extending from the second power extracting means.

The first power extracting means can include a first coil structure including a first coil section wound in a first direction, and a second coil section coplanar with the first coil section and wound in a second direction opposite the first direction, where the first coil section is wound about a first pole and the second coil section is wound around about a second pole, and where the means for permitting passage between sections of the coupling enhancing means extends substantially parallel to a geometric line extending between the first and second poles. The flux from the first and second poles can be in opposite directions.

The second power extracting means can include a second coil structure wound about a first pole, and where the means for permitting passage between sections of the coupling enhancing means substantially intersects the first pole. The second coil structure can interact with a vertical magnetic flux.

The first power extracting means can include a first coil structure including a first coil section wound in a first direction, and a second coil section coplanar with the first coil section and wound in a second direction opposite the first direction, the coupling enhancing means can include a ferrite block structure including two ferrite block sections, the means for permitting passage between sections of the coupling enhancing means can include a longitudinally extending slot between the two ferrite block sections, and the longitudinally extending slot in the ferrite block structure can pass over the centers of the first and second coil sections of the first coil structure, and can pass over the center of the second coil structure.

BRIEF DESCRIPTION OF THE DRAWINGS

FIG. 9A is a cross-section of an assembled vehicle charging pad.

FIG. 9B is a detail view of section B of FIG. 9A.

FIG. 9C is a detail view of section C of FIG. 9A.

Figure 1:
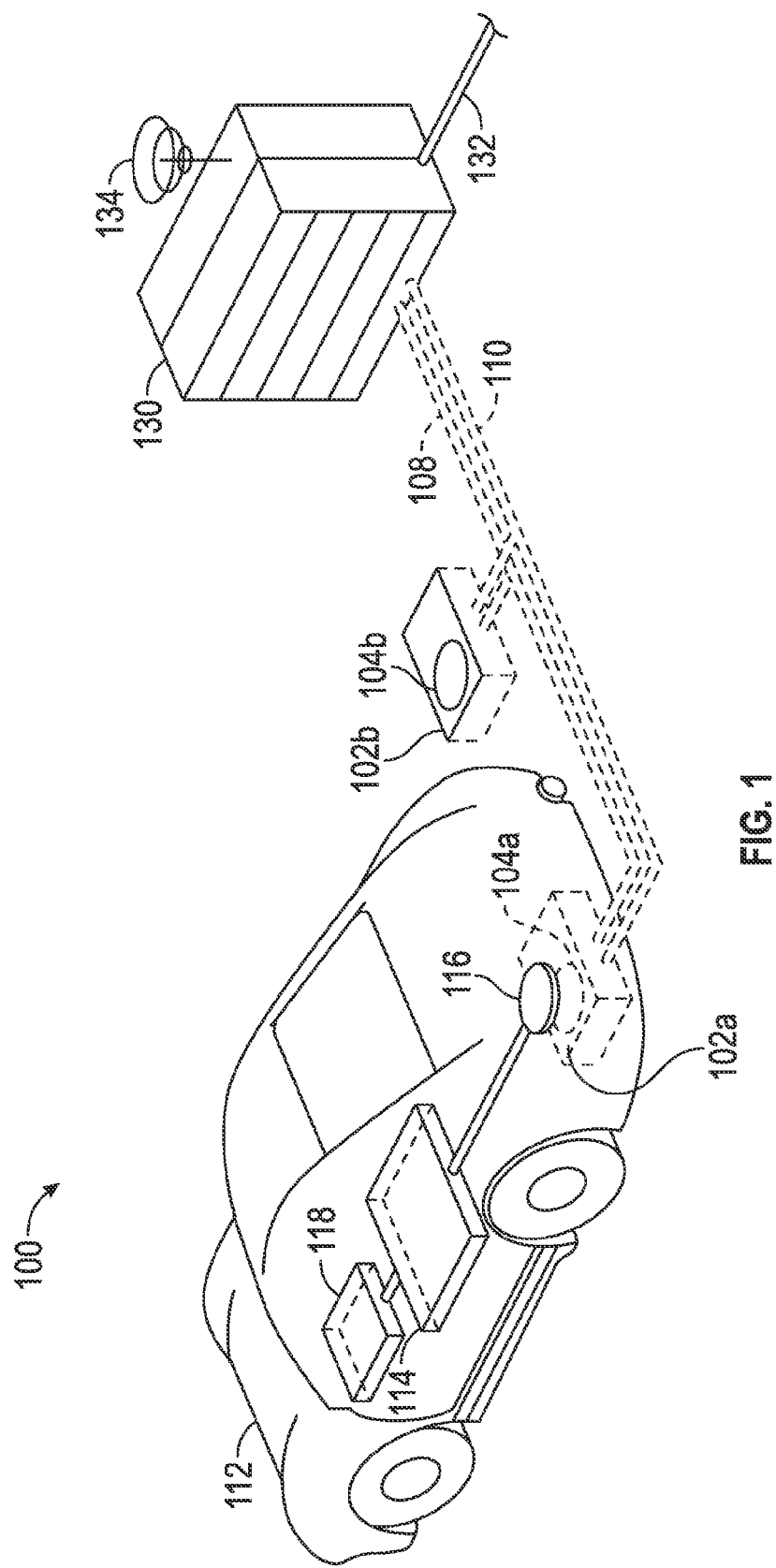
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
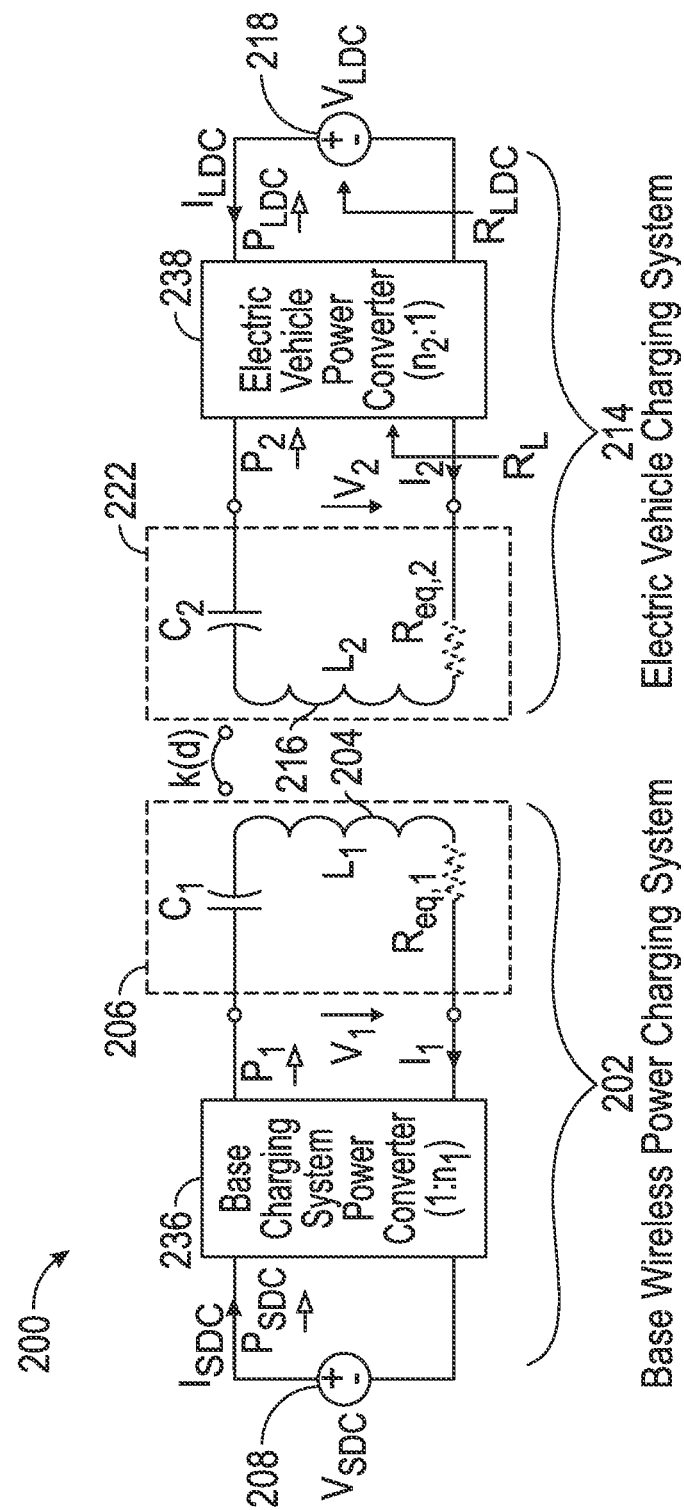
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
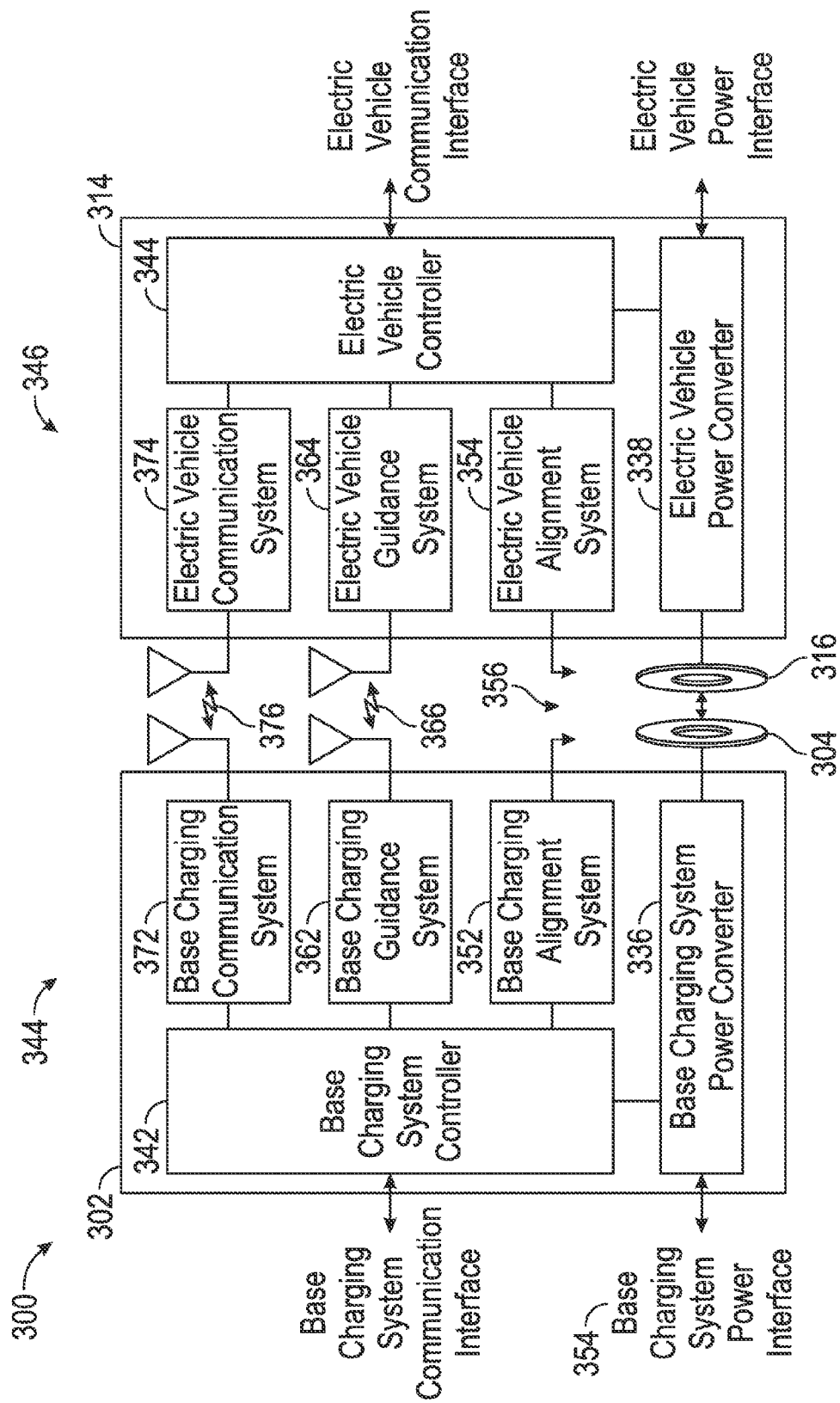
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
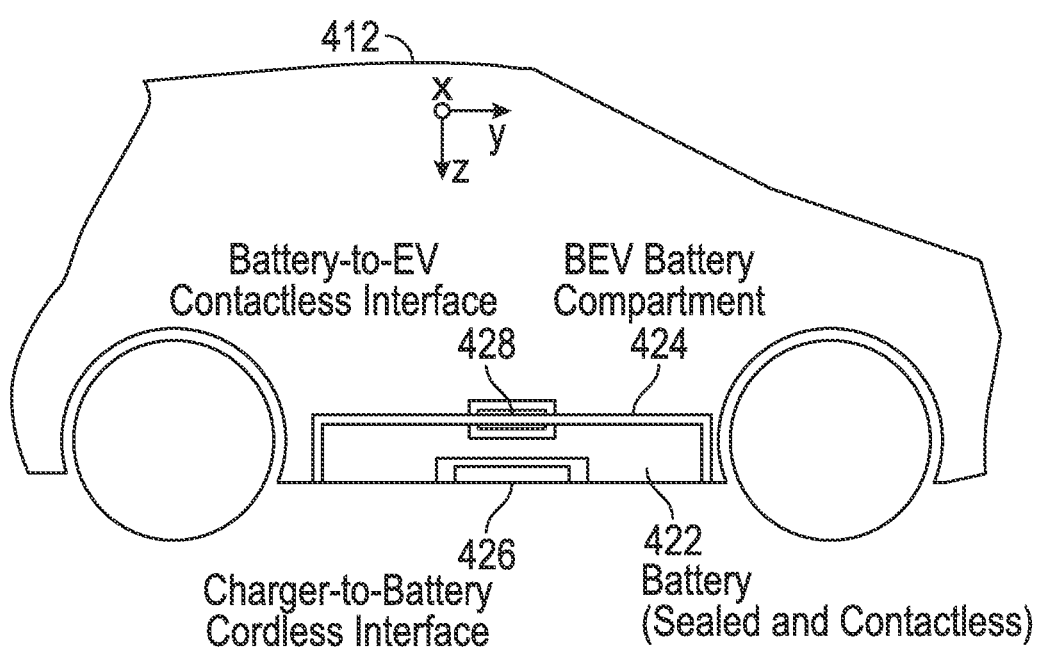
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
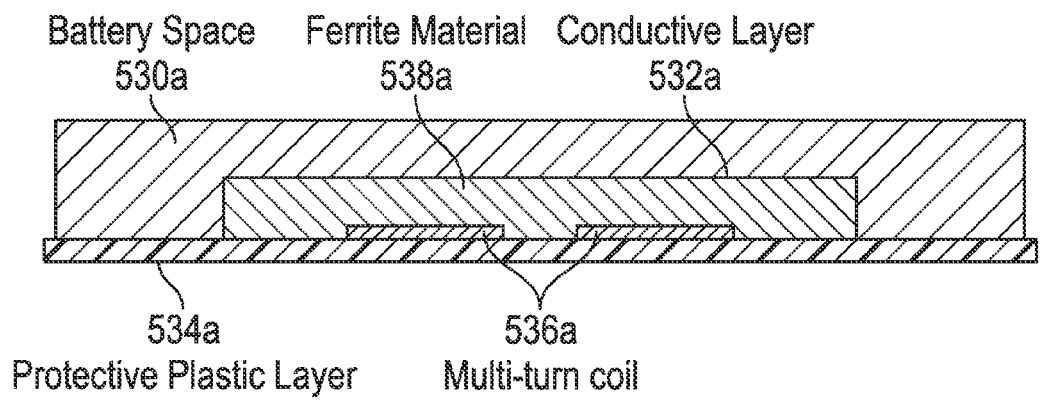
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
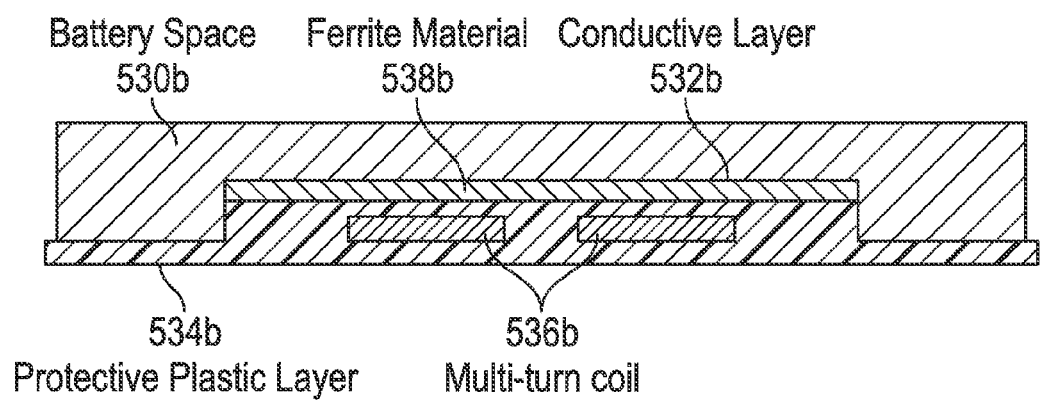

FIG. 5B shows an optimally dimensioned ferrite plate (i.e., ferrite backing) to enhance coupling and to reduce eddy currents (heat dissipation) in the conductive shield 532b. The ferrite material 538b may provide, among other things, means for enhancing coupling between a coil 536b and a wireless charging system. In particular, the ferrite material 538b may provide means for enhancing coupling between the coil 536b and a base system induction coil, such as base system induction coil 104a (see FIG. 1) of a wireless charging system. The coil 536b may be fully embedded in a non-conducting non-magnetic (e.g., plastic) material. For example, as illustrated in FIGS. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
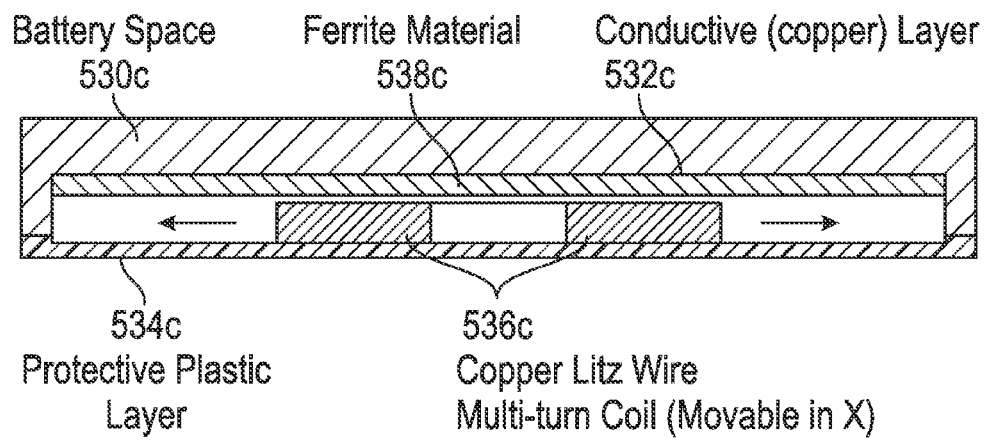
Figure 5D:
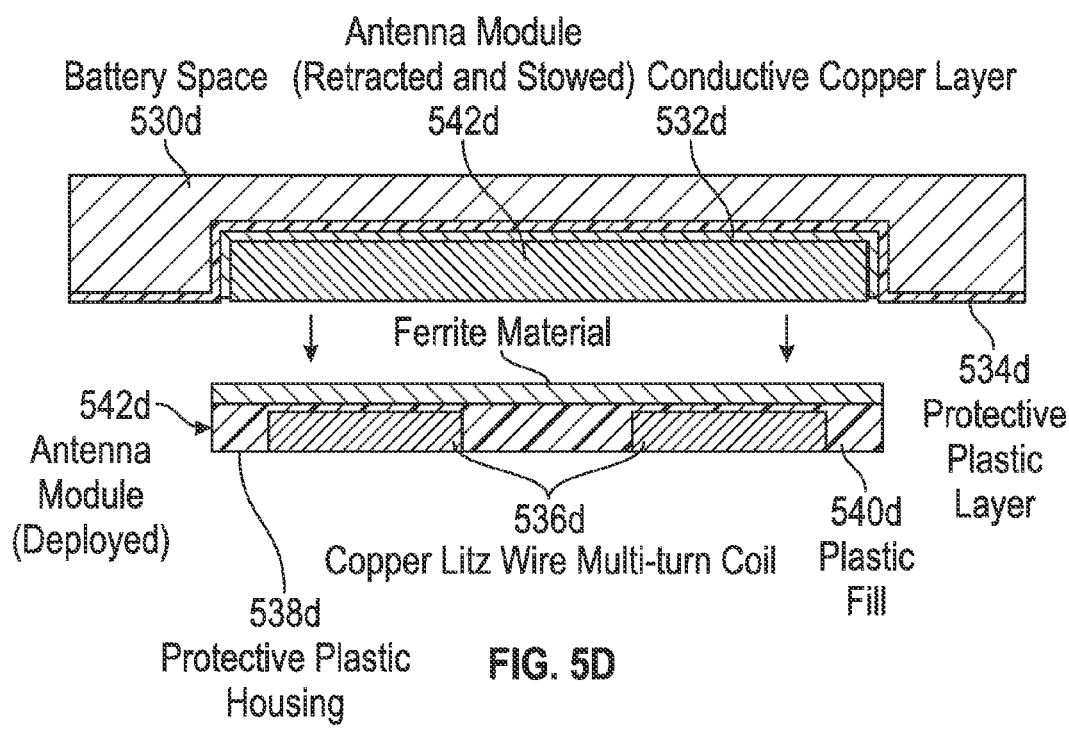

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 534d may be used to protect the conductive shield 532d, the coil 536d, and the ferrite material 5d38 from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 534d (e.g., plastic layer) is provided between the conductive shield 532d and the electric vehicle induction coil module 542d when the electric vehicle induction coil module 542d is not in a deployed state. The physical separation of the electric vehicle induction coil module 542d from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

In an electric vehicle IPT system 300, tolerance in the longitudinal (i.e., forwards/backwards relative to the vehicle 112) direction and the transverse (i.e., side-to-side) direction is desirable. In different situations, it may be beneficial to have a greater degree of tolerance to misalignment in the longitudinal or transverse direction. It is therefore desirable for an electric vehicle IPT system 300 to have flexibility in tolerance to suit the requirements of a particular situation.

In accordance with an embodiment, an IPT system may include a base coil arrangement, typically positioned on the ground that includes two separate co-planar coils positioned above a core formed from a material of high magnetic permeability, such as ferrite. Furthermore, there may be a conductive back plate below the magnetic core acting as a shield and an additional flux shaper. In this arrangement, there is no straight path through the core that passes through the coils. As such, if particularly driven with currents in opposite sense, this coil arrangement, referred to as a 'Double D' arrangement, produces two distinct magnetic pole areas and lines of magnetic flux arc between them in the form of a "flux pipe" above the coils, a zone of high flux concentration called the functional space of the IPT system. The magnetic moment that is generated by this structure is substantially horizontal as opposed to that of a planar single coil structure called a 'Circular' pad, which is substantially vertical.

In accordance with various embodiments described herein, three or more coils or loops may also be used in the coil arrangement of the receiver (pick-up) device or base device. The receiver device is also referred to herein as a vehicle pad. The first two coils or loops of the three or more coils or loops may be separate co-planar loops of a single coil structure forming a 'Double D' as in the base coil arrangement. During energy transfer, this 'Double D' is aligned with the 'Double D' in the transmitter (base) device. The third coil, referred to herein as a 'Quadrature' coil, is positioned above the 'Double D' on the same side of the magnetically permeable core. The 'Quadrature' coil allows power to be extracted from the vertical component of the magnetic field intercepted by the receiver device in addition to the horizontal component, which is extracted by the 'Double D.' As for a solenoid coil structure, the 'Double D' has tolerance to misalignment between the transmitter and receiver devices in the direction perpendicular to their magnetic moment but less tolerance to misalignment in the direction parallel to their magnetic moment. The triple coil arrangement built of a 'Double D' (DD) and a 'Quadrature' (Q) in the vehicle pad may improve the tolerance of the IPT system in the parallel direction, thus increasing the overall tolerance of the system to misalignment in any direction. In other embodiments, however, the coil arrangement may include only a single coil structure, as discussed in greater detail below. Thus, the DD coil may provide means for extracting power from a horizontal component of a magnetic field intercepted by the receiving device (such as a charging pad), and the quadrature coil may provide means for extracting power from a vertical component of a magnetic field intercepted by the receiving device.

One aspect of embodiments described herein are directed to coil structures that improve the ability to achieve low emission levels (e.g., EMF exposure levels below ICNIRP'98 reference levels or radio frequency interference levels e.g., below limits as defined by European Norm EN 300330 or FCC part 15) while performing charging of electric vehicles. For example, certain embodiments may achieve low emission levels, even where a vehicle underbody is metallic and/or includes a metallic shield and/or if ground structure includes electrically well conducting materials e.g., ferrous bars in a ferroconcrete ground.

Horizontal planar conductive structures above the vehicle pad and below the base pad generally may not substantially suppress magnetic fields at some positions where people may be located in normal use cases. In contrast, they may act as a magnetic flux channel increasing the magnetic flux density at these locations, if compared to a system operated in absence of such conductive structures.

As opposed to a 'circular' single coil pad, the conductive back plate and any extension thereof that may surround the magnetic structure of the pad or other conductive surface such as the vehicle steel underbody or any other additional underbody shielding or conductive ground structure may not help to suppress emission levels at critical locations except in the vehicles interior (passenger compartment). This may related to the magnetic field boundary conditions. Magnetic field components perpendicular to a well conductive surface do not substantially exist. They are cancelled by the induced eddy currents (Lenz law).

Figure 6A:
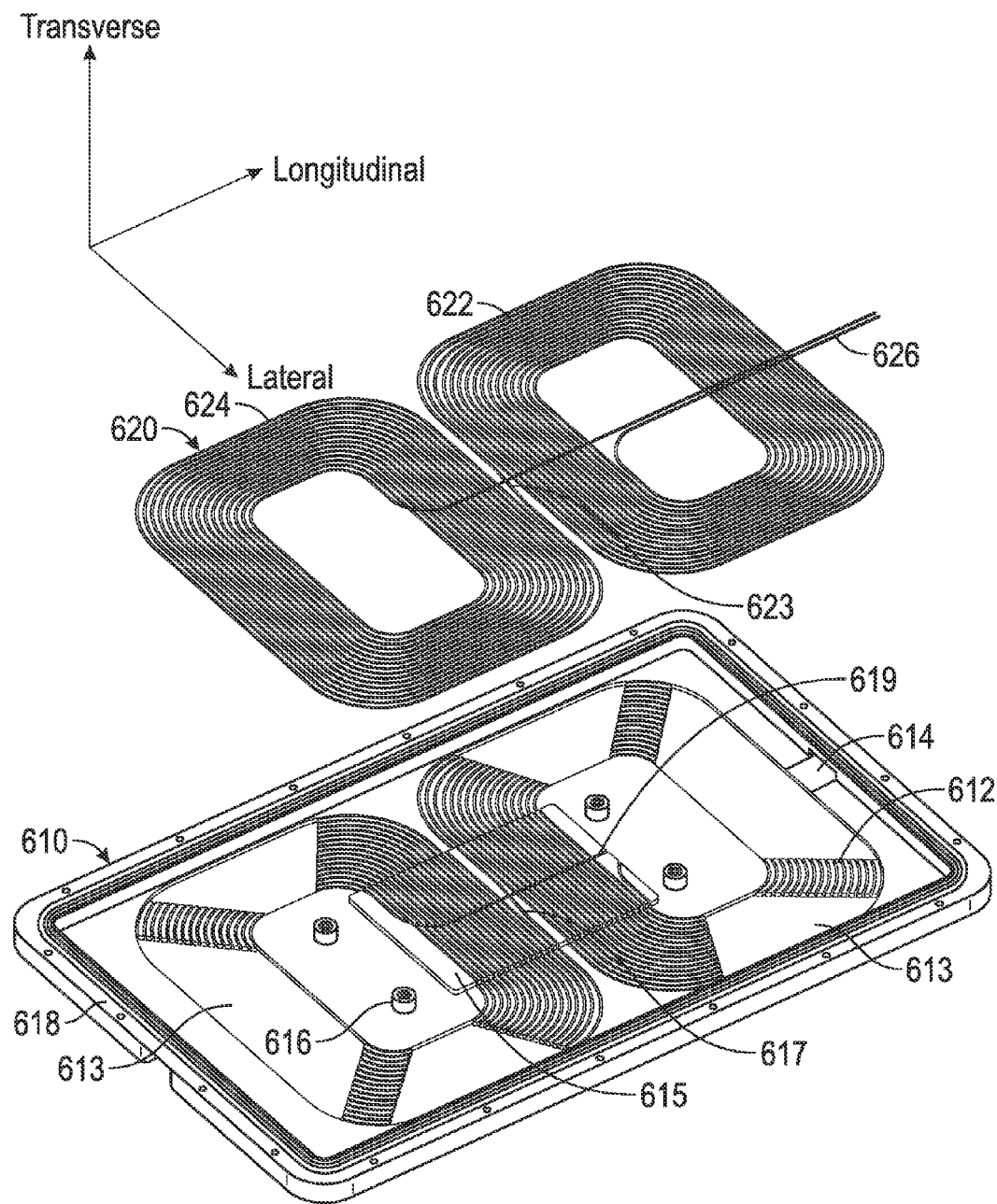
FIG. 6A is an exploded view of a vehicle pad cover and a DD coil structure.

FIG. 6A is an exploded view of a vehicle pad cover and a DD coil structure. The vehicle pad cover 610 is generally rectangular and substantially planar in shape. In the illustrated implementation, the dimensions of the vehicle pad cover 610 are greatest in a direction referred to herein as the "longitudinal" or front-to-back direction, somewhat smaller in a direction referred to herein as the "lateral" or side-to-side direction, and much smaller in a direction referred to herein as the "transverse" or top-to-bottom direction. The longitudinal, lateral, and transverse axes and/or directions depicted in FIG. 6A and used with respect to FIG. 6A and associated figures are being used to describe to a charging pad and the components thereof. The use of these terms is not intended to imply any specific mounting arrangement of the charging pad relative to a vehicle or other device to which the charging pad is attached. While in some implementations a charging pad may be mounted on a vehicle such that the longitudinal axis of the charging pad extends from front-to-back of the vehicle, other mounting arrangements can be used as well.

A generally rectangular depression is formed in one side of the vehicle pad cover 610 and surrounded by a lip 618 extending around the periphery of the vehicle pad cover. A plurality of concentric grooves 612 are formed in rounded rectangular depressions 613 in the base of the depression and shaped and dimensioned to receive the coils of DD coil structure 620. The grooves 612 in the illustrated implementation include sections of two adjacent groups of concentric rounded rectangles which are shaped and dimensioned to maintain DD coil structure 620 in a desired shape.

Portions of the grooves 612 pass through a raised rectangular structure 615 in the center of the depression, along with a transitional groove 617 connecting the two groups of concentric rounded rectangles and a longitudinally extending groove 619 which is generally perpendicular to several of the grooves 612 and the transitional groove 617. Although the raised section 615 is depicted and described herein as generally rectangular, other shapes and/or dimensions may also be used. The vehicle pad cover 610 also includes at least one aperture 614 extending through a shorter sidewall of the vehicle pad cover 610. Four pegs 616 extend outward from the surface of the vehicle pad cover 610 in which the groove 612 is formed, two pegs 616 inside each of the two loops of the groove 612.

Figure 6B:
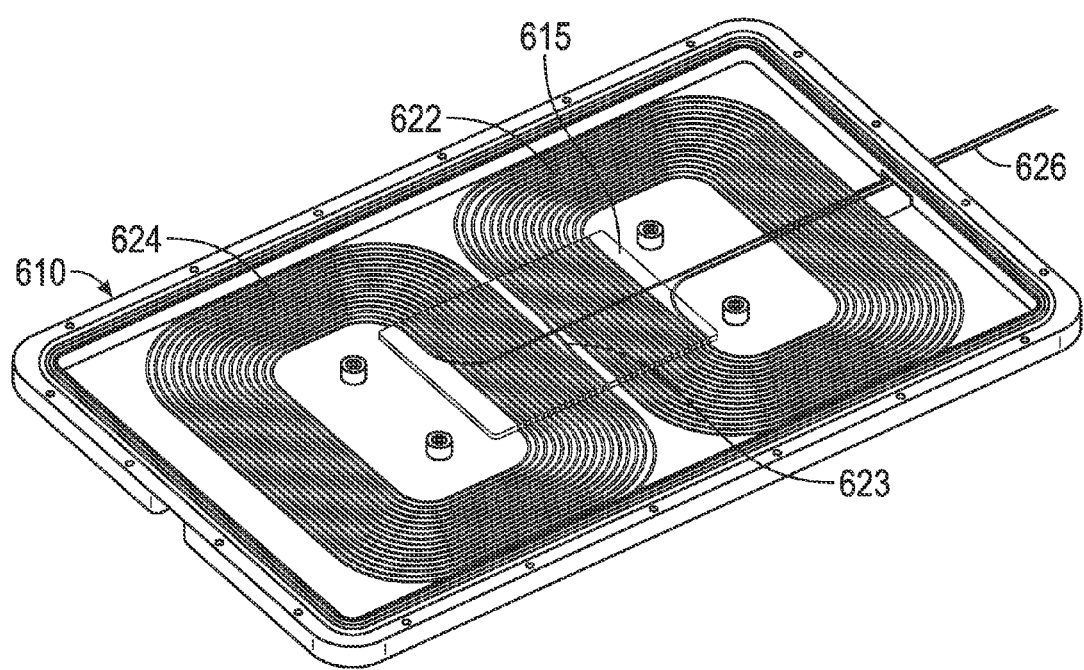
FIG. 6B is a perspective view of the assembled vehicle pad cover and DD coil of FIG. 6A.

The DD coil structure 620 is formed from a single wire which is shaped to form a first multi-turn loop or coil 622 and a second multi-turn loop or coil 624 which is coplanar with the first coil 622. In some implementations the wire is a uni-filar Litz wire. In the illustrated implementation, the first coil 622 is located proximal the ends 626 of the wire and the first coil 622 is wound about a first pole 602 from the inside out, while the second coil 624 is located distal the wire ends 626 and the second coil 624 is wound about a second pole 604 from the outside in. Because the first coil 622 is wound in the opposite direction as the second coil 626, the two coils can be driven in opposite sense, as discussed above, to produce two distinct magnetic pole areas and lines of magnetic flux between them, and the flux from the first coil 622 and the second coil 624 will be in opposite directions FIG. 6B is a perspective view of the assembled vehicle pad cover and DD coil of FIG. 6A. The ends 626 of the wire forming the DD coil structure 620 are located on the opposite side of the first and second coils 622, 624 as the groove 612 in the vehicle pad cover 610, and pass through the aperture 614 in the vehicle pad cover 610. One end 626 of the wire forming the DD coil structure 620 passes through the longitudinally extending groove 619 (see FIG. 6A) formed in the raised rectangular section 615 of the cover 610 where it connects to the inside loop of coil 624. The end 626 that connects to the inside loop of coil 624 passes over or under a portion of the transition section 623 of the wire forming the DD coil structure 620 that passes through the transitional groove 617 (see FIG. 6A) in the raised rectangular section 615 of the cover 610 and connects the outer loop of coil 622 to the outer loop of coil 624.

Figure 7A:
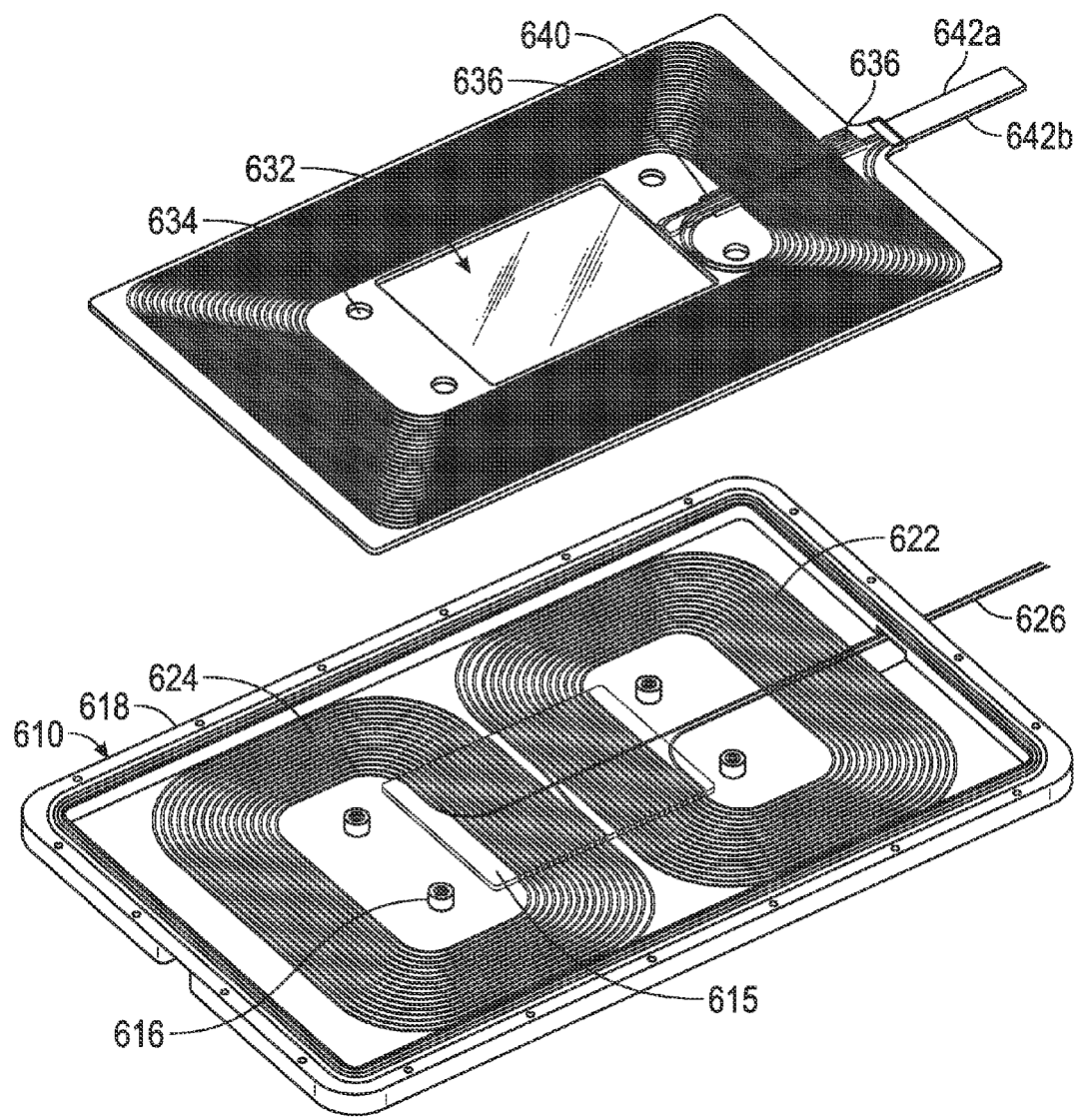
FIG. 7A is an exploded view of a quadrature coil and support plate shown relative to the vehicle pad cover and DD coil of FIG. 6B.

FIG. 7A is an exploded view of a quadrature coil and support plate shown relative to the vehicle pad cover and DD coil of FIG. 6B. The quadrature support plate 630 includes a central aperture 632 dimensioned to receive the raised rectangular section 615 of cover plate 610. The quadrature support plate 630 also includes four apertures 634 located outward of the central aperture 632 and dimensioned to receive the pegs 616 of the cover plate 610. The quadrature support plate 630 supports a quadrature coil 640 formed of two parallel wires looped around a pole 606 extending through the central aperture 632 of the quadrature support plate 630. The quadrature coil 640 will interact with a vertical magnetic flux which flows along the pole 606.

The quadrature coil 640 includes a first end 642*a* where the parallel wires extend from the outer edge of the quadrature coil 640 and a second end 642*b* where the parallel wires extend from the inner edge of the quadrature coil 640 and pass over the loops of the quadrature coil 640 on the opposite side of the quadrature coil 640 as the quadrature support plate 630. The quadrature support plate 630 also includes groove segments 636 located on either side of a section of the loops of the quadrature coil 640 and defining four wire paths passing over the loops of the quadrature coil 640. The wires in second end 642*b* of the quadrature coil 640 are seated in two of the four wire paths defined by the groove segments 636.

Figure 7B:
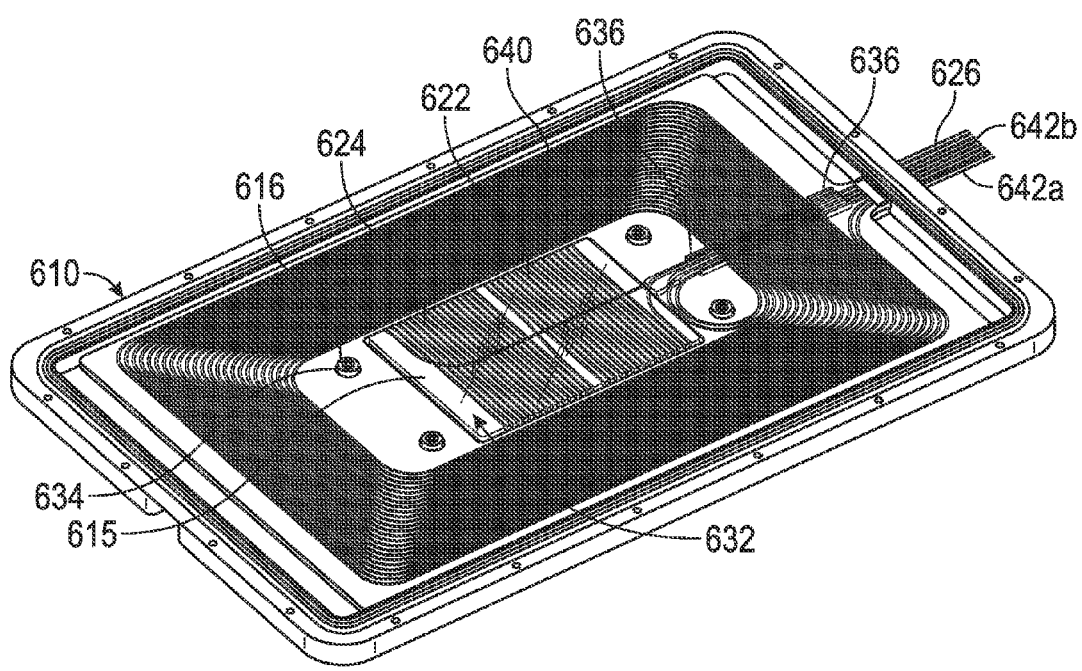
FIG. 7B is a perspective view of the assembled components of FIG. 7A.

FIG. 7B is a perspective view of the assembled components of FIG. 7A. In particular, it can be seen that the pegs 616 of the vehicle pad cover 610 have been inserted through the corresponding apertures 634 in the quadrature support plate 630, such that the DD coil structure 620 is located between the vehicle pad cover 610 and the quadrature support plate 630. The ends 626 of the DD coil structure 620 have been passed through the central aperture 632 in the quadrature support plate 630 and seated within the other two wire paths formed by the groove segments 636 on either side of the loops of the quadrature coil 640. The wire ends 626 of the DD coil structure 620 and the second end 642*b* of the quadrature coil 640 are thus seated in one of the three wire paths defined by the groove segments 636 and extend generally parallel to one another over the loops of the quadrature coil 640. On the outside of the loops of the quadrature coil 640, the first end 642*a* of the quadrature coil 640 extends parallel to the wire ends 626 of the DD coil structure 620 and the second end 640*b* of the quadrature coil 640 and through the aperture 614 in the vehicle pad cover 610.

Figure 7C:
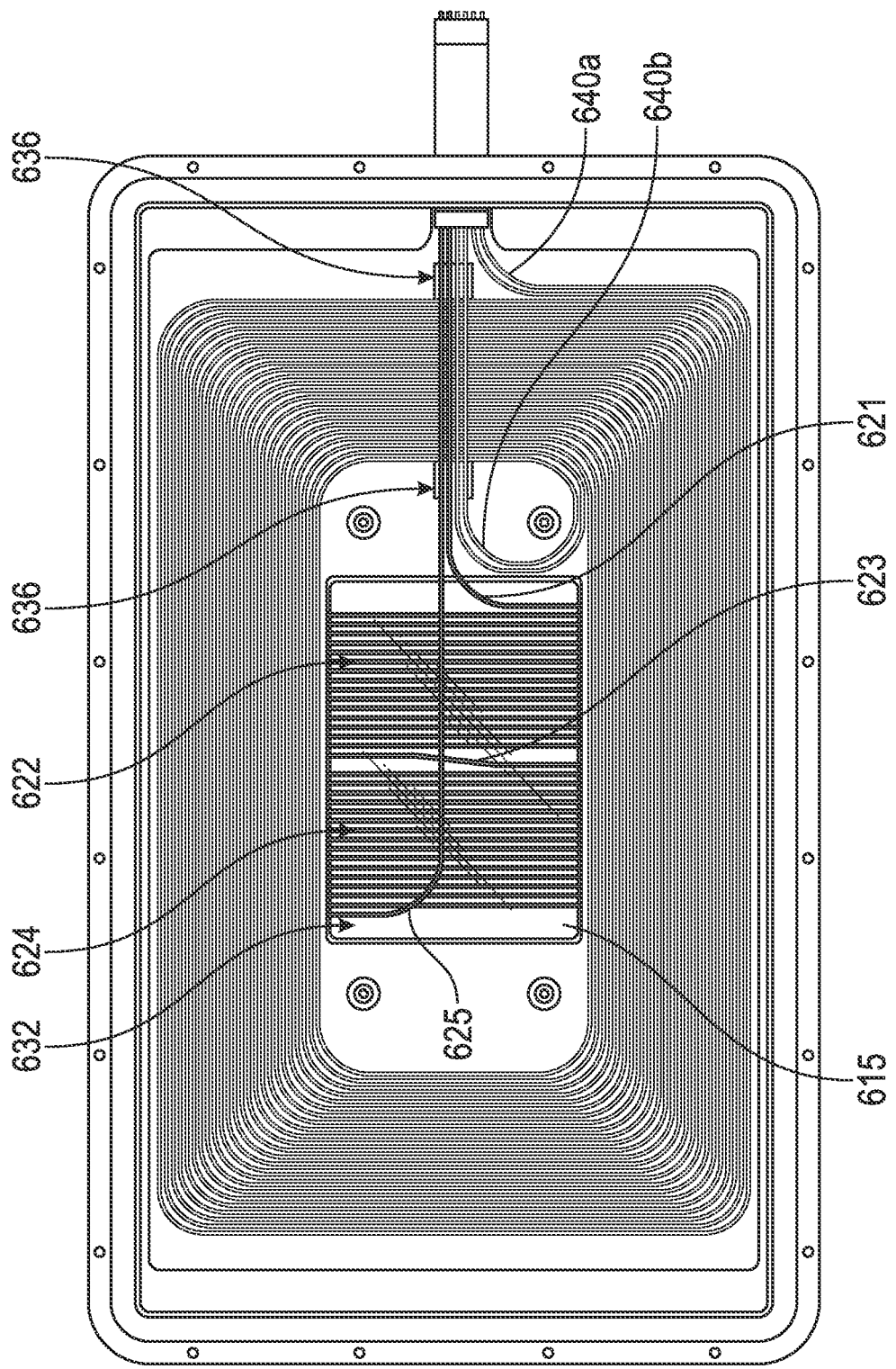
FIG. 7C is a top plan view of the assembled components of FIG. 7B.

FIG. 7C is a top plan view of the assembled components of FIG. 7B. The transition section 623 between the first coil 622 and the second coil 624 of the DD coil structure 620 is visible through the aperture 632 in the quadrature support plate 630. It can also be seen that the DD coil structure includes a first ramp section 621 extending from the first coil 622 and passing upwards through the aperture 632 in the quadrature support plate 630, and a second ramp section 625 extending from the second coil 625 which also passes upwards through the aperture 632 in the quadrature support plate 630. The ramp sections connect with the wire ends 626 seated in the groove sections 636 which pass over the coils of the quadrature coil 640.

Figure 8:
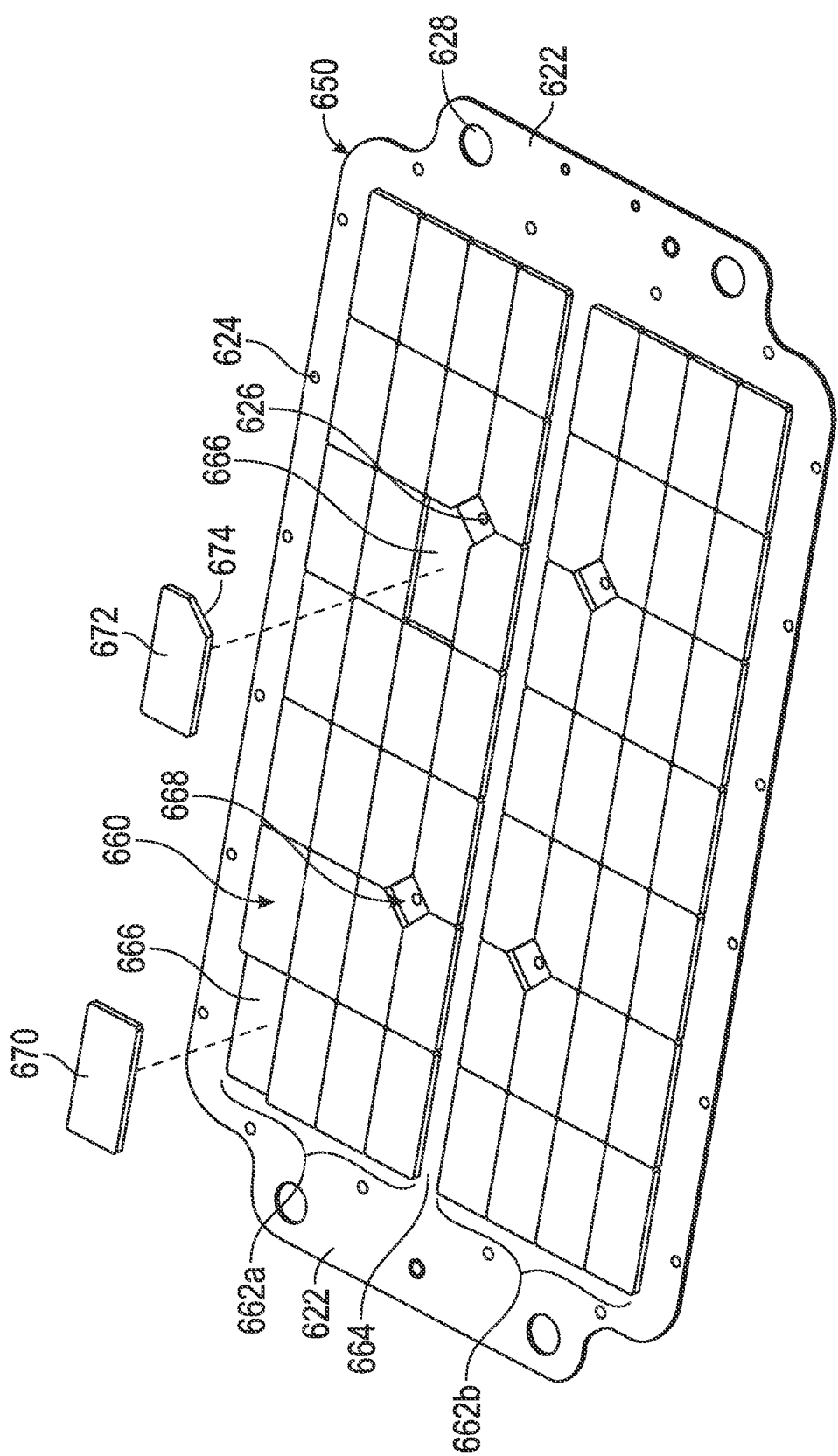
FIG. 8 is a partially exploded perspective view of a base plate for a vehicle charging pad and a modular ferrite block assembly supported thereon.

FIG. 8 is a partially exploded perspective view of a base plate for a vehicle charging pad and a modular ferrite block assembly supported thereon. The base plate 650 is generally rectangular planar structure which includes two longitudinally extending tabs 652 extending from each of the shorter sides of the rectangular structure. The base plate 650 includes a plurality of peripheral apertures 654 arranged in a rectangular shape near the periphery of the base plate 650 and four internal apertures 656 located in an interior region of the base plate 650. The rectangular arrangement of the peripheral apertures 654 corresponds to the shape of the lip 618 of the vehicle pad cover 610, and can be used to secure the vehicle pad cover 610 to the base plate 650. Similarly, the positions of the four internal apertures 656 correspond to the locations of the pegs 616 in the vehicle pad cover 610 and can also be used to secure the vehicle pad cover 610 to the base plate 650. Any suitable fastener or other component can be used in conjunction with the peripheral apertures 654 or internal apertures 656 to provide means for securing the vehicle pad cover 610 to the base plate 650, including but not limited to bolts, screws, rivets, clams, nails, and snap-fit components, as well as welding or similar methods of joining two materials together. In some implementations no apertures may be pre-formed in the base plate 650.

Mounting apertures 658 formed near the corners of the longitudinally extending tabs 652 of the base plate 650 can be used in conjunction with fasteners such as those discussed above or any other suitable component to secure an assembled charging pad in place. In an implementation in which the charging pad serves as a vehicle charging pad, the charging pad may be secured to the undercarriage or frame of the vehicle to position the vehicle charging pad underneath the vehicle as discussed above.

A modular ferrite block assembly 660 including a plurality of ferrite tiles 670 and 672 is secured to a surface of the base plate using adhesive. In the illustrated implementation, a plurality of adhesive pads 666 dimensioned to be substantially the same size and shape as the overlying ferrite tiles 670 or 672 are used, although in other implementations a single sheet of adhesive or region of applied adhesive may alternately be used. In the illustrated implementation, the adhesive may be a bonding tape such as the bonding tapes sold under the trademark VHB by 3M.

In the illustrated implementation, the ferrite tiles 670 and 672 are 5 mm thick, 75 mm long at their longest point, and 35 mm wide at their longest point, and are arranged with their largest dimension extending longitudinally as shown.

The ferrite tiles 670 and 672 are arranged in two separate 7 tiles by 4 tiles arrays as shown to form two ferrite block sections 662a and 662b separated by a longitudinally extending slot 664 therebetween. The longitudinally extending slot 664 is aligned with a longitudinally extending centerline of the base plate 650.

The depicted ferrite block sections 662a and 662b provide substantially contiguous ferrite sections with a length or longitudinal dimension of roughly 525 mm, a width or lateral dimension of roughly 140 mm, and a thickness or transverse dimension of roughly 5 mm. Although specific dimensions have been provided for the illustrated implementation, the above tile numbers and tile dimensions are merely exemplary, and any appropriate number of ferrite tiles of any desired size may be used to form a modular ferrite block assembly 660 of a desired overall shape and size. For example, in some implementations, the length of a substantially contiguous section of ferrite blocks can range from 100 mm to 3 m, the width can range from 50 mm to 3 m, and the thickness can range from 1 mm to 50 mm. The appropriate dimensions of the substantially contiguous arrangement of ferrite blocks may vary based on the usage of the charging pad. For vehicular applications, the size of the charging pad may be much larger than the size of the charging pad for an electronic device. For example, the width and/or length of the charging pad may be determined based on the size of the vehicle on which the charging pad is to be mounted. In some embodiments, for example, the width of the charging pad may be any dimension equal to or less than the width of the vehicle, and the length of the charging pad may be any dimension equal to or less than the distance between vehicle tires located forward of the charging pad and tires located rearward of the charging pad. Other dimensions and/or configurations of the charging pad relative to vehicle components may also be used to determining appropriate dimensions for the vehicle charging pad.

The modular ferrite block assembly 660 includes at least two different shapes of ferrite tiles, referred to herein as ferrite tiles 670 and ferrite tiles 672. In particular, the modular ferrite block assembly 660 includes 40 substantially rectangular ferrite tiles 670 and 16 chamfered ferrite tiles 672 which include a 16 mm corner chamfer 674 at one corner of the chamfered ferrite tiles 672. By arranging the chamfered ferrite blocks 672 around the internal apertures 656 of the base plate 650 and oriented with each chamfer 674 posited proximal the internal apertures 656, the chamfers 674 cooperate to form apertures 668 in the ferrite block sections 662a and 662b. These internal apertures 676 allow securement internal to the modular ferrite block assembly 660 to increase the rigidity of the assembled vehicle charging pad.

In the illustrated implementation, the corners of the substantially rectangular ferrite blocks 670 and the three corners of the chamfered ferrite blocks 672 which do not include chamfers 674 may also include a slight chamfer to facilitate tighter assembly of the ferrite block structure. Air gaps between the individual ferrite tiles 670 and 672 may significantly impact inductance and Q-factor of a ferrite-backed coil in an assembled charging pad. By at least slightly chamfering all corners of the substantially rectangular ferrite blocks 670 and the chamfered ferrite blocks 672, small size variations resulting from manufacturing tolerance can be better accommodated, enabling almost gapless assembly of ferrite block structures from ferrite tiles 670 and 672. In the absence of these small chamfers, even slight variations in size would cause corner conflicts that could result in air gaps between tiles. Magnetic simulations have shown that slight chamfers have an insignificant impact on the performance of a ferrite-backed coil.

By providing two groups of closely packed ferrite tiles 670 and 672, the ferrite block assembly 660 can include two substantially contiguous ferrite block sections 662a and 662b. Despite the presence of apertures 668 and small gaps or chamfers between the individual ferrite tiles 670 and 672, the magnetic performance of the substantially contiguous ferrite block sections 662a and 662b will be substantially the same as the magnetic performance of a pair of similarly dimensioned solid ferrite sections when used in conjunction with the coil structures described herein.

FIG. 9A is a cross-section of an assembled vehicle charging pad. FIG. 9B is a detail view of section B of FIG. 9A, and FIG. 9C is a detail view of section C of FIG. 9A. The vehicle charging pad 600 of FIG. 9A has been assembled by securing the base plate 650 to the vehicle pad cover 610, securing the modular ferrite block assembly 660, the quadrature coil 640, the quadrature support plate 630, and the DD coil structure 620 therebetween. As can be seen in FIG. 9B, an insulating layer 682 may also be provided between the modular ferrite block assembly 660 and the quadrature coil 640. Mounting structures 686 engage the mounting apertures 658 formed near the corners of the longitudinally extending tabs 652 of the base plate 650 (see FIG. 8) and allow securement of the vehicle charging pad 600 to an overlying vehicle (not shown). In contrast to solenoidal structures, in which wire coils are wrapped around a ferrite core, the coils are generally disposed on a single side of the ferrite block assembly 660 with a small portion of the wire passing through the slot between ferrite block assembly 660, in the non-solenoidal arrangement of the coils and ferrite structure of the vehicle charging pad 600.

Because the first end 642b of the quadrature coil 640 and the wire ends 626 of the DD coil structure 620 extend generally parallel to one another and along the centerline of the vehicle pad 610 as they pass over the loops of the quadrature coil 640 (see FIG. 7B), these upwardly extending wire sections can be aligned with the longitudinally extending slot 664 between ferrite block sections 662a and 662b (see FIG. 8). As can be seen in FIG. 9C, the upwardly extending section 684 of a wire end 626 of the DD coil extends into the space occupied by the modular ferrite block assembly 660, reducing the overall thickness of the vehicle charging pad 600 by at least the thickness of the first end 642b of the quadrature coil 640 and the wire ends 626 of the DD coil structure 620. The longitudinally extending slot 644 thus provides means for permitting passage between the ferrite block sections 662a and 662b of at least one wire (such as first end 642b) extending from the quadrature coil 640 and at least one wire (such as wire ends 626) of the DD coil structure 620.

Figure 10:
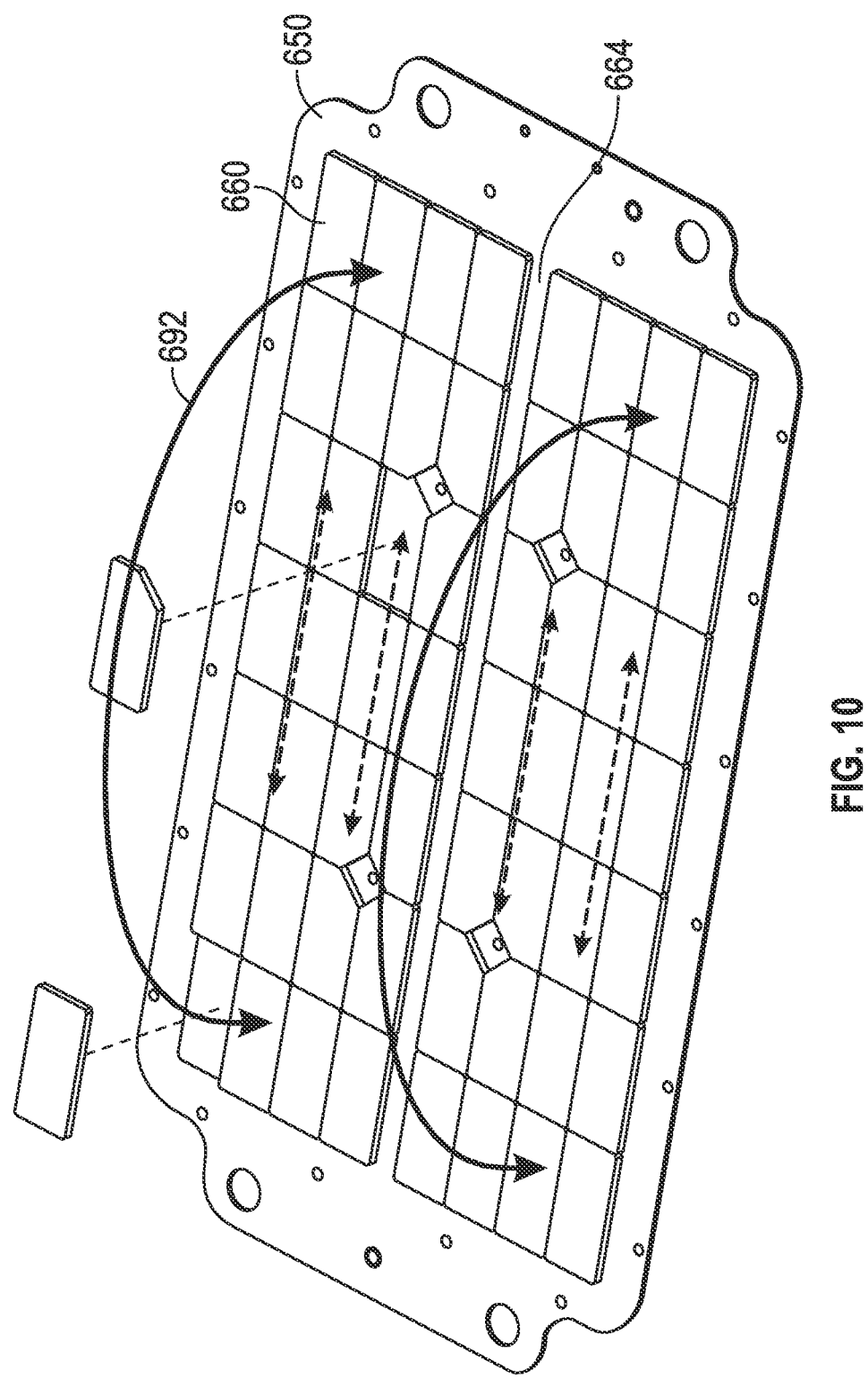
FIG. 10 is a partially exploded perspective view of the base plate and modular ferrite block assembly of FIG. 8 schematically depicting the flux generated by a DD coil structure.
Figure 11:
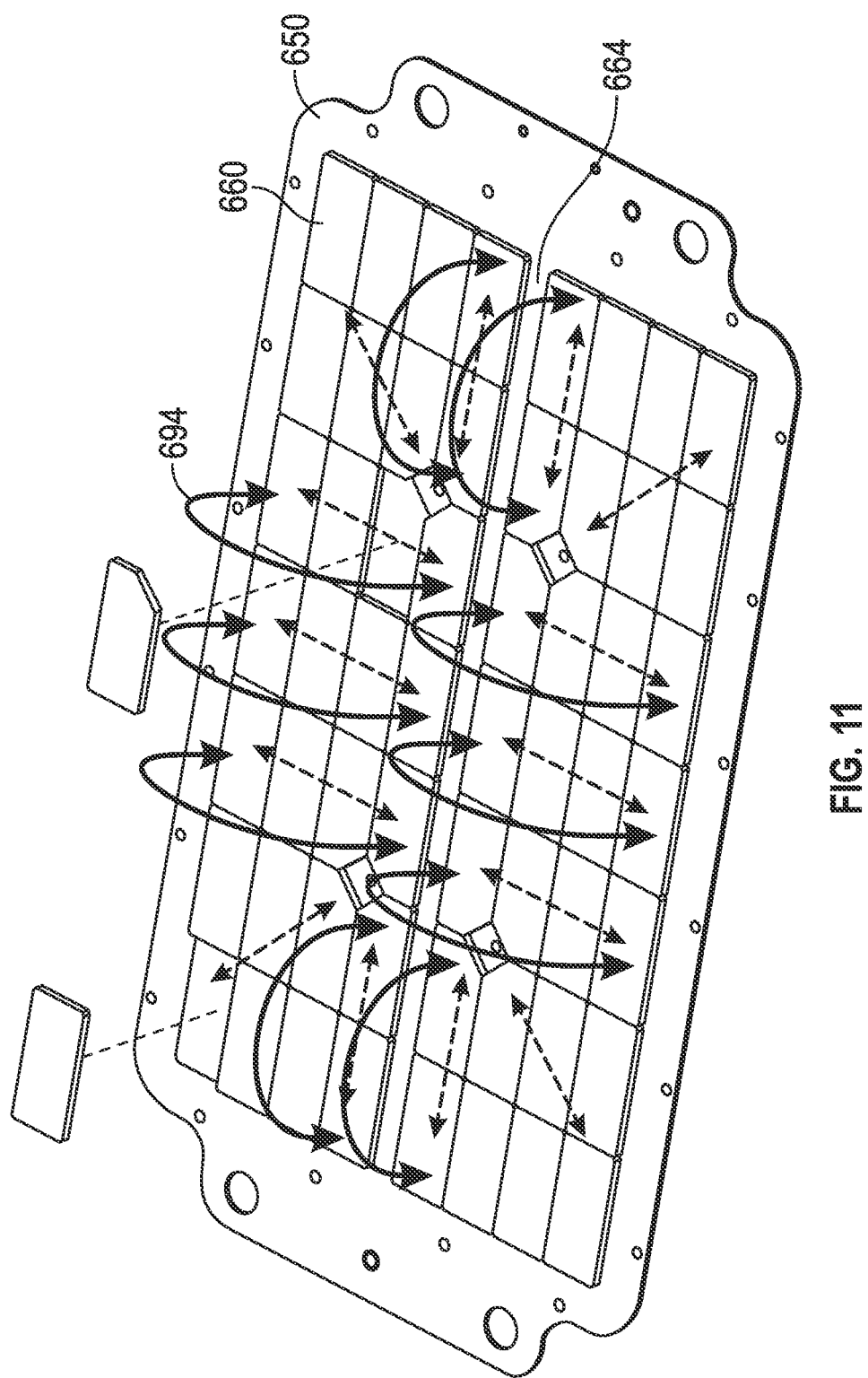
FIG. 11 is a partially exploded perspective view of the base plate and modular ferrite block assembly of FIG. 8 schematically depicting the flux generated by a quadrature coil.

FIG. 10 is a partially exploded perspective view of the base plate and modular ferrite block assembly of FIG. 8 schematically depicting the flux generated by a DD coil structure. FIG. 11 is a partially exploded perspective view of the base plate and modular ferrite block assembly of FIG. 8 schematically depicting the flux generated by a quadrature coil. Due to the placement of the slot 664 in the modular ferrite block assembly 660, the overall thickness of an assembled vehicle charging pad 600 (see FIG. 9A) can be reduced without significantly impacting the magnetic performance of the assembled vehicle charging pad.

Because the slot 664 extends in a longitudinal direction, it passes over or very close to the center of both the first coil 622 and the second coil 624 of the DD coil structure 620

(see, for example, FIGS. 6A and 6B). In particular, the slot 664 will substantially intersect the first pole 602 about which the first coil 622 is wound and the second pole 604 about which the second coil 624 is wound. As can be seen in FIG. 10, the magnetic flux 692 generated by the DD coil structure 620 is generally parallel to the direction of the longitudinally extending slot 664. Because the slot is generally aligned with the magnetic flux 692 generated by the DD coil structure, there will be almost no increase in the magnetic resistance (alternately referred to as reluctance) of the magnetic flux path of the DD coil structure.

Similarly, because the slot 664 extends in a longitudinal direction, the slot 664 extends over the center of the quadrature coil 640 (see, for example, FIGS. 7A and 7B). As can be seen in FIG. 11, the slot 664 is again at a location where it has a minimal impact on the magnetic flux 694 generated by the quadrature coil 640, as the magnetic flux 694 is either essentially parallel to or vertically escaping from the modular ferrite block assembly 660, so that again there is little increase in the magnetic resistance of the magnetic path of the quadrature coil 640. Magnetic simulations have shown that the inclusion of the slot 664 exerts a minor impact on the performance of both the DD coil structure 620 and the quadrature coil 640 in terms of both inductance and losses in the ferrite and conductive back plate due to the inducement of eddy currents.

As discussed briefly above, the use of a ferrite structure including a longitudinally extending groove or slot is not limited to three-loop arrangements with multiple coil structures as shown above. In other implementations, the inclusion of a groove or slot may enable reduced dimensions of any charging pad which includes a coil with at least one wire section passing over another coil section, such as a wire section extending from the interior of a multi-turn loop.

Figure 12A:
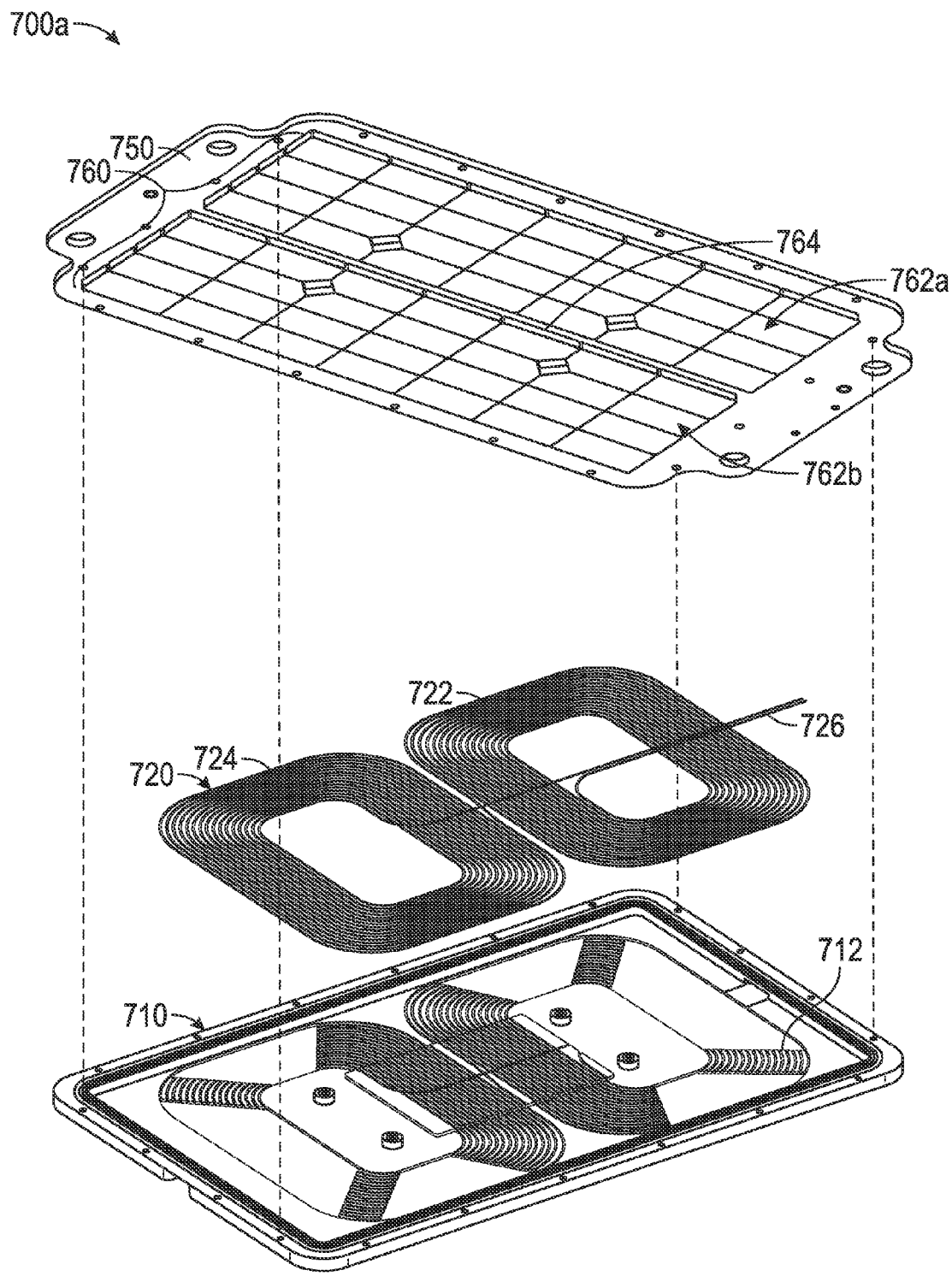
FIG. 12A is a partially exploded perspective view of another vehicle pad including a single coil structure which includes two multi-turn loops.

FIG. 12A is a partially exploded perspective view of a vehicle pad including a single coil structure which includes two multi-turn loops. The vehicle pad 700a includes a base plate 750 supporting a ferrite structure 760, which includes two ferrite sections 762a and 762b separated by a longitudinally extending slot 764 therebetween. The vehicle pad 700a also includes a single coil structure 726 in the form of a DD coil structure 720, and a vehicle pad cover 710 which may include grooves 712 dimensioned to retain the DD coil structure 720.

The DD coil structure 720 includes a first multi-turn loop or coil 722 and a second multi-turn loop or coil 724 which is coplanar with the first coil 722. As discussed above with respect to the DD coil structure 622 (see FIG. 6A), the first coil 722 is located proximal the ends 726 of the wire and the first coil 722 and is wound from the inside out, while the second coil 724 is located distal the wire ends 726 and is wound from the outside in. In such an arrangement, the wire ends 726 extending from the interiors of the first and second coils 722 and 724 must pass over or under portions of the first and second coils 722 and 724, increasing the thickness of the DD coil structure 720.

However, as discussed above, the inclusion of the longitudinally extending slot 764 between the two ferrite sections 762a and 762b of the ferrite structure 760 allows for the wire ends 726 to be routed through the slot, so that the increase in thickness of the DD coil structure 720 resulting from the wire ends 726 passing over the coils 722 and 724 does not result in an increase in the overall thickness of the assembled charging pad 700a.

Figure 12B:
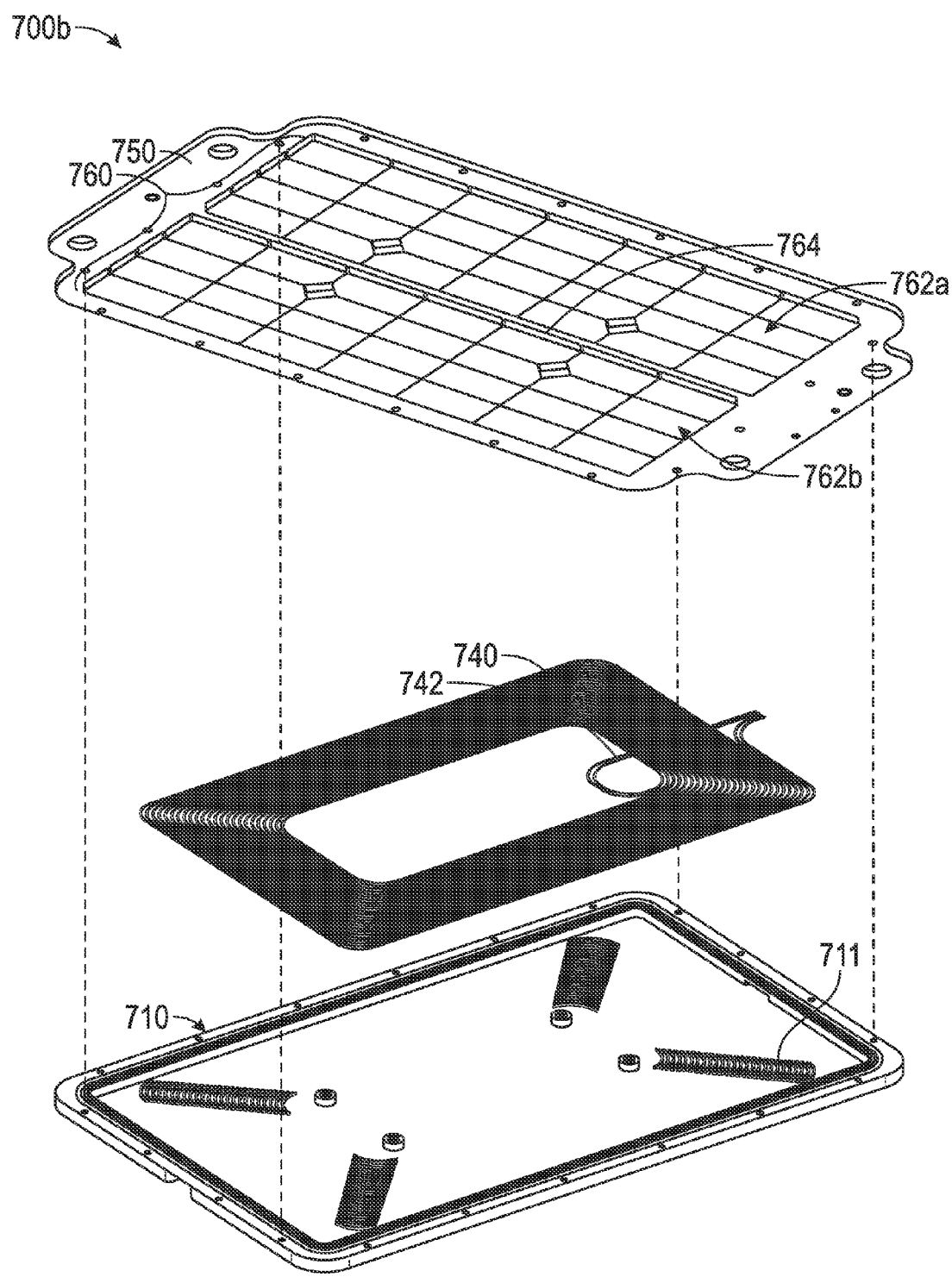
FIG. 12B is a partially exploded perspective view of a vehicle pad including a single coil structure which includes a single multi-turn loop.

FIG. 12B is a partially exploded perspective view of a vehicle pad including a single coil structure which includes a single multi-turn loop. The vehicle pad 700b includes a base plate 750 supporting a ferrite structure 760, which includes two ferrite sections 762a and 762b separated by a longitudinally extending slot 764 therebetween. The vehicle pad 700b also includes a single coil structure 740 in the form of a single multi-turn loop, and a vehicle pad cover 710 which may include grooves 711 dimensioned to retain the coil structure 420.

The single coil structure 740 may in some embodiments be a coil structure formed from two parallel wires, like the quadrature coil 640 of FIG. 7A. The wire end or ends 742 extending from the interior of the multi-turn loop of coil structure 740 and passing over or under a section of the single coil structure 740 increases the thickness of the coil structure 740 but does not increase the thickness of the assembled vehicle charging pad 700b as the wire end or ends 742 can pass through the longitudinally extending slot 764. Although the embodiments of FIGS. 12A and 12B are described with respect to specific coil structures, the inclusion of a longitudinally extending slot or groove between ferrite sections can enable reduced dimensions of any charging pad arrangement in which a portion of one or more coil structures passes over or under another portion of the one or more coil structures to increase the thickness of the one or more coil structures.

Although certain features of the illustrated implementations have been discussed above, not all of those features are necessary features of alternate implementations unless specifically identified as such. In implementation in which the manufacturing tolerance for the ferrite tiles is sufficiently precise, the small chamfers on the corners of the tiles may be eliminated. In some implementations, such as for smaller charging pads, the internal securement provided by the pegs and apertures passing near the center of the device may be omitted.

Although the ferrite block is described in certain embodiments herein as being a modular assembly formed from a plurality of ferrite tiles, the ferrite block may in other implementations be, for example, two contiguous ferrite blocks separated by a slot. In implementations in which the ferrite block is thicker than the wires, a depression may be formed in a contiguous ferrite block, rather than a slot which separates two distinct ferrite block sections. In other implementations where the ferrite block is thicker than the wires, at least some of the wires passing through the slot or groove may not be positioned side by side as shown, but may instead be transversely offset from other wires to allow for a thinner groove or slot. In another alternate limitation, a slot may extend only a portion of the way through a contiguous ferrite block, and may or may not extend to the edge of the ferrite block.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A charging pad, comprising:
   a first coil structure, the first coil structure including:
      a first coil section wound in a first direction; and
      a second coil section coplanar with the first coil section and wound in a second direction opposite the first direction;
   a second coil structure; and
   a ferrite block structure, the ferrite block structure including two ferrite block sections separated by a longitudinally extending slot, and at least one wire extending from the first coil structure and at least one wire extending from the second coil structure extending through a portion of the longitudinally extending slot in the ferrite block structure.

2. The pad of claim 1, wherein the first coil section is wound about a first pole and the second coil section is wound around about a second pole, and wherein the longitudinally extending slot is substantially parallel to a geometric line extending between the first and second poles.

3. The pad of claim 2, wherein the flux from the first and second poles are in opposite directions.

4. The pad of claim 2, wherein each of the corners of the ferrite tiles include at least a slight chamfer.

5. The pad of claim 2, wherein the ferrite tiles include:
   a plurality of substantially rectangular ferrite tiles; and
   plurality of ferrite tiles having at least one chamfered corner, wherein four of the plurality of ferrite tiles are positioned such that the chamfered corners are located adjacent one another to form an aperture extending through the ferrite block assembly.

6. The pad of claim 1, wherein the second coil structure is wound about a first pole, and wherein the longitudinally extending slot substantially intersects the first pole.

7. The pad of claim 6, wherein the second coil structure interacts with a vertical magnetic flux.

8. The pad of claim 1, wherein the longitudinally extending slot in the ferrite block structure passes over the centers of the first and second coil sections of the first coil structure, and passes over the center of the second coil structure.

9. The pad of claim 1, wherein the ferrite block structure is located on the opposite side of the second coil structure from the first coil structure.

10. The pad of claim 1, wherein the ferrite block structure is a modular ferrite block assembly including a plurality of ferrite tiles.

11. The pad of claim 1, additionally including:
   a base plate supporting the ferrite block structure; and
   a pad cover supporting the first coil structure, wherein the base plate is secured to the pad cover with the first coil structure, the second coil structure, and the ferrite block structure disposed therebetween.

12. The pad of claim 1, wherein:
   the first coil structure includes a first wire extending from the first coil section and a second wire extending from the second coil section; and
   the second coil structure includes a third wire extending from an interior of the second coil structure and a fourth wire extending from an exterior of the second coil structure, wherein at least the first, second and third wires extend through a portion of the longitudinally extending slot in the ferrite block structure.

13. The pad of claim 12, wherein the first and second wires pass through the center of the second coil structure and pass over the second coil structure on the opposite side of the second coil structure from the first and second coil portions of the first coil structure.

14. The pad of claim 13, additionally including a support plate supporting the second coil structure.

15. The pad of claim 14, wherein the support plate includes:
   a first plurality of groove segments located on the interior of the second coil structure; and
   a second plurality of groove segments located on the exterior of the second coil structure and cooperating with the first plurality of groove segments to define at least three wire paths extending over the second coil structure, wherein the first, second and third wires are retained within the at least three wire paths.

16. The pad of claim 1, wherein each of the two ferrite block sections is a substantially contiguous assembly of a plurality of ferrite blocks.

17. The pad of claim 1, wherein the first and second coil structures are disposed primarily on a single side of the ferrite block structure.

18. A ferrite block structure for use in a charging pad, the structure comprising:
   a base plate;
   a first ferrite block section supported by the base plate, wherein the first ferrite block section is a first modular ferrite block assembly including a first plurality of ferrite tiles; and
   a second ferrite block section supported by the base plate and separated from the first ferrite block section by a longitudinally extending slot, wherein the second ferrite block section is a second modular ferrite block assembly including a second plurality of ferrite tiles.

19. The structure of claim 18, wherein the dimensions of first ferrite block section are equal to the dimensions of the second ferrite block section.

20. The structure of claim 18, wherein the longitudinally extending slot is aligned with a longitudinally extending centerline of the base plate.

21. The structure of claim 18, wherein the first and second ferrite block sections are secured to the base plate by an adhesive.

22. The structure of claim 18, wherein each of the corners of the ferrite tiles include at least a slight chamfer.

23. The structure of claim 18, wherein the ferrite tiles include:
   a plurality of substantially rectangular ferrite tiles; and
   a plurality of ferrite tiles having at least one chamfered corner, wherein four of the plurality of ferrite tiles having at least one chamfered corner are positioned such that the chamfered corners are located adjacent one another to form an aperture extending through the ferrite block assembly.

24. A charging pad, comprising:
   first means for extracting power from a horizontal component of a magnetic field intercepted by the charging pad;
   second means for extracting power from a vertical component of the magnetic field intercepted by the charging pad;
   means for enhancing coupling between the first and second power extracting means and a wireless charging system; and
   means for permitting passage between sections of the coupling enhancing means of at least one wire extending from the first power extracting means and at least one wire extending from the second power extracting means.

25. The pad of claim 24, wherein the first power extracting means includes a first coil structure, the first coil structure including:
   a first coil section wound in a first direction; and
   a second coil section coplanar with the first coil section and wound in a second direction opposite the first direction, wherein the first coil section is wound about a first pole and the second coil section is wound around about a second pole, and wherein the means for permitting passage between sections of the coupling enhancing means extends substantially parallel to a geometric line extending between the first and second poles.

26. The pad of claim 25, wherein the flux from the first and second poles are in opposite directions.

27. The pad of claim 24, wherein the second power extracting means includes a second coil structure wound about a first pole, and wherein the means for permitting passage between sections of the coupling enhancing means substantially intersects the first pole.

28. The pad of claim 27, wherein the second coil structure interacts with a vertical magnetic flux.

29. The pad of claim 24, wherein:
   the first power extracting means includes a first coil structure, the first coil structure including:
      a first coil section wound in a first direction; and
      a second coil section coplanar with the first coil section and wound in a second direction opposite the first direction;
   the coupling enhancing means includes a ferrite block structure including two ferrite block sections;
   the means for permitting passage between sections of the coupling enhancing means includes a longitudinally extending slot between the two ferrite block sections; and
   the longitudinally extending slot in the ferrite block structure passes over the centers of the first and second coil sections of the first coil structure, and passes over the center of the second coil structure.

* * * * *